(12) United States Patent
Gu et al.

(10) Patent No.: US 10,007,479 B2
(45) Date of Patent: Jun. 26, 2018

(54) USER TERMINAL, METHOD FOR PLAYING AUDIO DATA VIA BLUETOOTH, AND DIGITAL SIGNAL PROCESSOR

(71) Applicant: Spreadtrum Communications (Shanghai) Co., Ltd., Zhangjiang, Shanghai (CN)

(72) Inventors: Xiangxin Gu, Shanghai (CN); Shouhua Liu, Shanghai (CN); Zhi Zhang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 134 days.

(21) Appl. No.: 14/926,540

(22) Filed: Oct. 29, 2015

(65) Prior Publication Data

US 2016/0170705 A1    Jun. 16, 2016

(30) Foreign Application Priority Data

Dec. 10, 2014    (CN) .......................... 2014 1 0756804

(51) Int. Cl.
*G06F 3/16*    (2006.01)
*G10L 19/00*    (2013.01)
(Continued)

(52) U.S. Cl.
CPC .............. *G06F 3/162* (2013.01); *G06F 3/165* (2013.01); *H04W 4/008* (2013.01);
(Continued)

(58) Field of Classification Search
USPC ....................................................... 455/41.2
See application file for complete search history.

(56) References Cited

U.S. PATENT DOCUMENTS 5,293,586 A * 3/1994 Yamazaki .............. G06K 15/02
345/501
2002/0129213 A1* 9/2002 Goudie ................... H04L 49/90
711/154
(Continued)

FOREIGN PATENT DOCUMENTS

CN             1832482 A        9/2006
CN             1925350 A        3/2007
(Continued)

OTHER PUBLICATIONS

CN 102255906 A English https://encrypted.google.com/patents/CN102255906A?cl=en.*
(Continued)

*Primary Examiner* — Maharishi V Khirodhar
*Assistant Examiner* — Kenneth P Hunt
(74) *Attorney, Agent, or Firm* — Cantor Colburn LLP (57) ABSTRACT

A user terminal, a method for playing audio data via Bluetooth, and a digital signal processor are provided. The method includes: a digital signal processor receiving a basic packed data template from an application processor; a SBC module coding audio source data to obtain the audio data packet; the digital signal processor implementing a data packing to the audio data packet based on the basic packed data template, to obtain a packed audio data packet; the digital signal processor implementing dividing and packing to the packed audio data packet to obtain a data packet to be sent; and the digital signal processor sending the data packet requested to be sent to a Bluetooth controller via a PCM interface between the digital signal processor and the Bluetooth controller. Accordingly, the digital signal processor instead of the application processor is employed to achieve audio play, thus reducing power consumption.

8 Claims, 6 Drawing Sheets

(51) Int. Cl.
*H04W 4/00* (2018.01)
*G10L 19/02* (2013.01)

(52) U.S. Cl.
CPC .......... *G10L 19/0208* (2013.01); *Y02D 70/00* (2018.01); *Y02D 70/144* (2018.01)

(56) References Cited

U.S. PATENT DOCUMENTS

| | | | |
|---|---|---|---|
| 2003/0091044 A1* | 5/2003 | DeMars | H04L 29/06027 370/389 |
| 2006/0036758 A1 | 2/2006 | Zhodzishsky et al. | |
| 2006/0205449 A1* | 9/2006 | Hillyard | H04L 63/10 455/575.2 |
| 2006/0217061 A1* | 9/2006 | Steele | H04H 60/92 455/3.06 |
| 2007/0049196 A1* | 3/2007 | Hillyard | G10L 19/0019 455/41.2 |
| 2008/0095056 A1* | 4/2008 | Lien | H04L 47/10 370/235 |
| 2009/0232041 A1* | 9/2009 | Smith | H04L 1/1867 370/312 |
| 2010/0138145 A1* | 6/2010 | Choi | G01C 21/265 701/533 |
| 2013/0089080 A1* | 4/2013 | Singer | G06F 13/385 370/338 |
| 2013/0343381 A1* | 12/2013 | Klimker | H04L 65/605 370/389 |

FOREIGN PATENT DOCUMENTS

| | | |
|---|---|---|
| CN | 101127712 A | 2/2008 |
| CN | 102006681 A | 4/2011 |
| CN | 102255906 A | 11/2011 |
| CN | 102882846 A | 1/2013 |

OTHER PUBLICATIONS

CN 102006681 A English https://encrypted.google.com/patents/CN102006681A?cl=en.*

SIPO First Office Action corresponding to CN Application No. 201410756804.4; dated Aug. 28, 2017.

* cited by examiner

| SBC Coding Setting | Medium Quality | | | | High Quality | | | |
|---|---|---|---|---|---|---|---|---|
| | Mono | | Joint Stereo | | Mono | | Joint Stereo | |
| Sampling Frequency | 44.1 | 48 | 44.1 | 48 | 44.1 | 48 | 44.1 | 48 |
| Bitpool Value | 19 | 18 | 35 | 33 | 31 | 29 | 53 | 51 |
| Final Frame Length | 46 | 44 | 83 | 79 | 70 | 66 | 119 | 115 |
| Final Bit Rate | 127 | 132 | 229 | 237 | 193 | 198 | 328 | 345 |
| Other settings: block length=16, allocation mode=Loudness, sub-bands=8 | | | | | | | | |

USER TERMINAL, METHOD FOR PLAYING AUDIO DATA VIA BLUETOOTH, AND DIGITAL SIGNAL PROCESSOR

CROSS-REFERENCE TO RELATED APPLICATIONS

The present invention claims priority under 35 U.S.C. § 119 to Chinese Application No. 201410756804.4, filed on Dec. 10, 2014, the entire content of which is incorporated herein by reference.

TECHNICAL FIELD

The present disclosure generally relates to wireless communication technology, and more particularly, to a user terminal, a method for playing audio data via Bluetooth, and a digital signal processor.

BACKGROUND

At first, some terms and their corresponding abbreviations used in the present disclosure are listed as follows:
BT: Bluetooth;
BT Controller: Bluetooth controller;
BT Host: Bluetooth upper layer module, which cooperates with a BT controller to realize BT functions;
HCI: Host Controller Interface, a standard software interface between the BT Controller and the BT Host;
HCI TRANS: HCI Transport layer, including regulations relevant to data format, retransmission, error processing, etc., in communications between a BT Controller and a BT Host;
AP: Application Processor;
DSP: Digital Signal Processor;
SBC: low complexity Sub-Band Codec;
A2DP: Advanced Audio Distribute Profile, defining protocols and processes of high quality audio distribution in an ACL channel;
ACL: Asynchronous Connection Like;
AVDTP: Audio Video Distribute Profile, residing in a transport layer;
L2CAP: Logical Link Control Adaptor Protocol, residing in a data link layer;
HCI ACL Data Packet: adapted for transmitting data between a host and a BT Controller;
UART: Universal Asynchronous Receiver/Transmitter;
PCM: a hardware interface used in audio transmission, including four signal wires, SYNC, CLK, TX and RX;
SRC: Source;
SSRC: Synchronization Source Identifier;
CID: Channel Identity;
RISC: Reduced Instruction Set Computer;
LSB: Least Significant Bit; and
MSB: Most Significant Bit.

Currently, various intelligent terminals, such as smart phones, tablet computers, etc., are configured with a function of playing audio data via Bluetooth (BT). Such a terminal can transmit data (generally including control signals and audio data packets) via BT to a playback device, such as an earphone, a speaker, etc., thus the playback device can play audio contents.

Generally, a user terminal possessing the function of playing audio data via BT (which is referred as "BT terminal" hereafter for short) at least includes an AP, a BT Controller, and a SBC module. The SBC module may be replaced by other type of coding modules with technology development. The AP at least includes HCI TRANS, HCI, L2CAP, AVDTP, and A2DP. Further, a UART interface capable of data transmission is configured between the BT Controller and the HCI TRANS in the AP.

During a process of playing an audio file via BT, functions of each layer are illustrated as follows.

By managing a state of the HCI TRANS, the UART interface can be controlled. Further, when serving as a receiver, the HCI TRANS is configured to: divide serial data from the BT Controller into frames, identify events and data from the frames, and send the identified events and data to the HCI for subsequent processing. When serving as a transmitter, the HCI TRANS is configured to: distinguish information sent from the upper HCI layer into commands and data, respectively mark the commands and the data with command/data labels and length indicators, and output the commands and the data via the UART interface. The marked labels and the length indicators are helpful for the BT Controller to implement frame division and command/data identification.

By managing a state of the HCI, the HCI TRANS can be controlled. Further, when serving as a receiver, the HCI is configured to: process the events and the data sent from the HCI transport layer according to HCI formats and protocols, reorganize the divided data, and manage a buffer. When serving as a transmitter, the HCI is configured to: divide commands and parameters/data requested by an upper layer according to a length of a controller buffer in the BT Controller, implement a HCI layer packing process according to the HCI formats, and request the HCI transport layer to send the data according to an occupancy state of the controller buffer. The occupancy state of the controller buffer is indicated by HCI number of packet complete event sent from the BT Controller.

Figure 1:
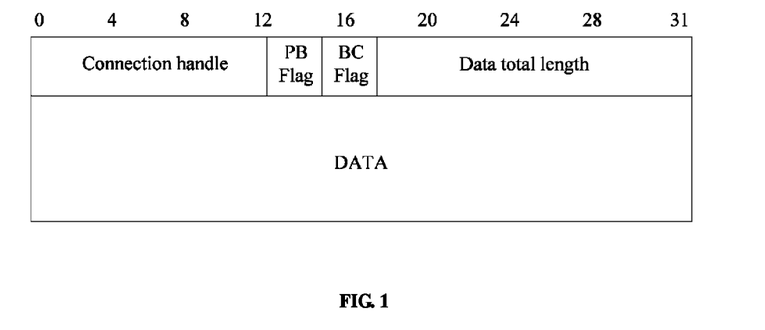
FIG. 1 schematically illustrates a data packet of HCI.

Referring to FIG. 1, a data packet of HCI is illustrated. In the data packet, a connection handle is configured to identify an ACL connection. A PB Flag and a BC Flag are also shown. However, the PB Flag and the BC Flag are irrelative to the present disclosure and herein will not be described in detail.

The L2CAP resides in the link layer. Its functions include: connection establishing, connection closing, state managing, multiplexing, data packet dividing, data packet assembling, etc.

Figure 2:
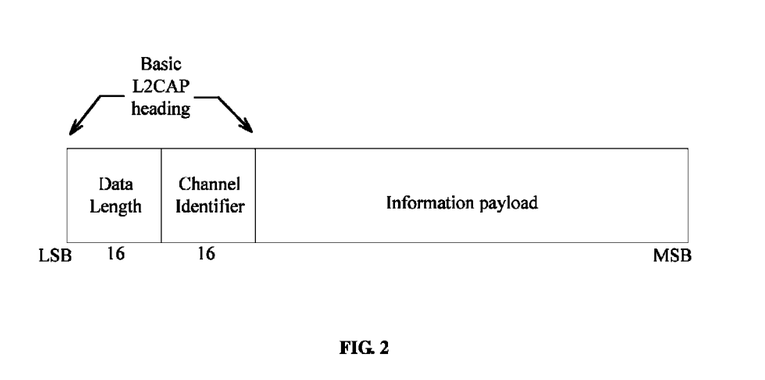
FIG. 2 schematically illustrates a data packet of L2CAP.

Referring to FIG. 2, a data packet of L2CAP is illustrated. In the data packet, the channel identifier refers to a channel identifier of a target L2CAP.

The AVDTP resides in the transport layer. Its functions include: connection opening, connection closing, state managing, signal processing, multiplexing, data packet dividing, data packet assembling, user data (e.g. A2DP SBC audio data) configuring and transmitting, etc.

Figure 3:
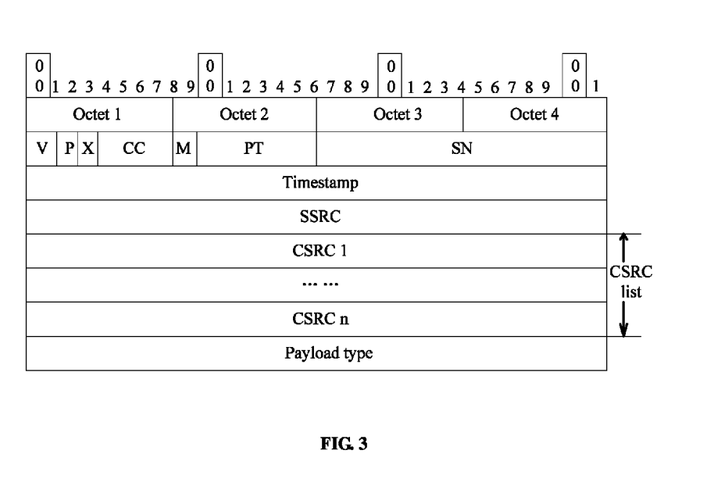
FIG. 3 schematically illustrates a data packet of AVDTP.

Referring to FIG. 3, a data packet of AVDTP is illustrated. In the data packet, CSRC (Contributing Source) count indicates a quantity of CSRCs. PT refers to payload type. SN refers to Sequence Number which increases by 1 once a packet is sent. Timestamp generally counts in measurement of audio digital sample signal.

The A2DP is configured to manage A2DP SRC (Source), such as open, configure, initiate, pause, etc., the A2DP SRC. The A2DP may be further configured to: negotiate with an opposite terminal about SBC parameters, and control the SBC module.

The SBC is a format of the A2DP transmitting audio. The SBC module is configured to code audio data into an audio data packet in SBC format. Coding implemented by the SBC module may include at least one parameter selected from a group consisting of: a sampling frequency, a channel mode, a block length, sub-bands, an allocation mode and a Bitpool.

Figure 4:
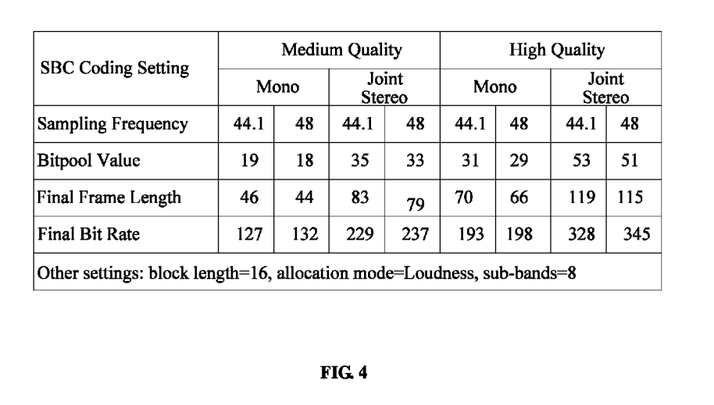
FIG. 4 schematically illustrates a typical code stream output rates of a SBC module.

FIG. 4 illustrates typical code stream output rates of a SBC module.

When playing audio data via BT, connections are established by: the HCI controlling the BT Controller to establish an ACL connection with an opposite terminal, which connection corresponds to the ACL handle; and establishing a L2CAP connection, and an AVDTP signaling/AVDTP streaming according to the ACL connection, in which the L2CAP connection is identified by a local-opposite CID pair.

The A2DP implements functions of playing, pausing and exception handling through AVDTP. Specifically, configurations of SBC parameters are defined in a configure procedure. The A2DP controls the SBC (e.g., controls the configuration, initiating or closing of the SBC) according to state changes in the AVDTP process. And audio data packets in SBC format are transmitted through the AVDTP.

Figure 5:
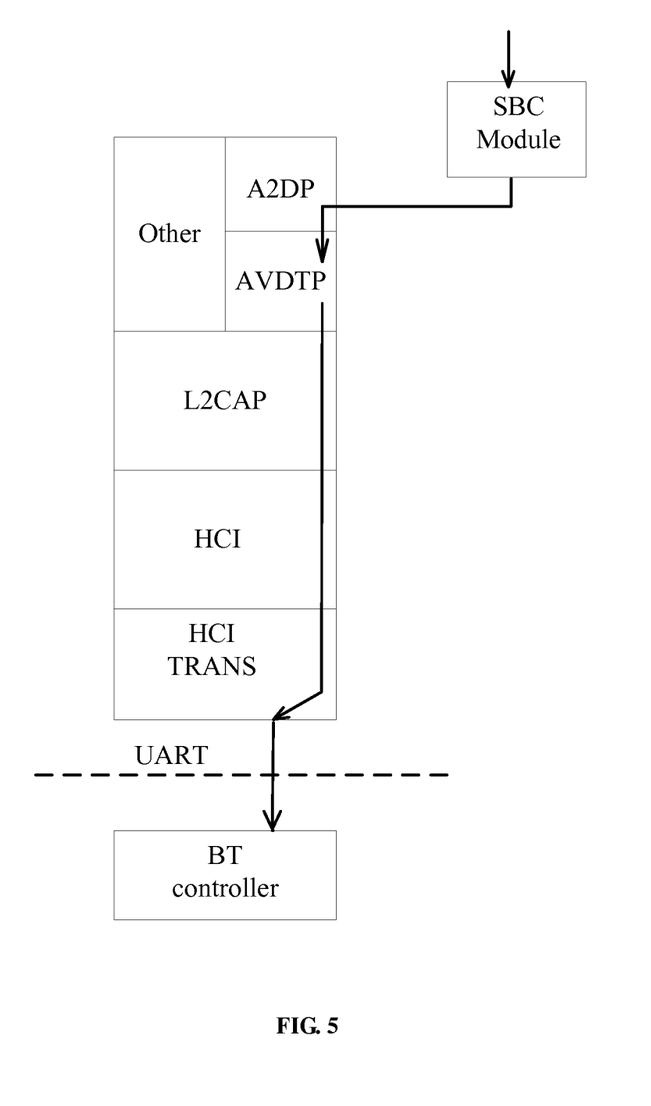
FIG. 5 schematically illustrates a process of playing audio data via Bluetooth according to prior art.

Referring to FIG. 5, a process of playing audio data via BT according to prior art is illustrated. In FIG. 5, arrows are used to indicate the direction of a data flow.

In prior art, audio data packets transmission requires processing in multiple layers in an AP, including a HCI transport layer, a HCI, a L2CAP layer, an AVDTP layer and an A2DP layer. And ultimately, these audio data packets are wirelessly transmitted to a playback device (e.g., a BT earphone) on the opposite side.

When playing audio data via BT, audio data packets are constantly generated and required to be processed by the aforesaid layers in the application processor. Accordingly, during the entire audio play process, the application processor is frequently occupied and thus unable to enter into a sleep mode. As a result, high power consumption will be caused.

SUMMARY

Embodiments of the present disclosure aim to solve a technical problem that: when a smart terminal plays audio data via Bluetooth, the application processor can hardly enter into a sleep mode due to the processing required for transmitting audio data packets.

In order to solve the technical problem as stated hereinbefore, a method for playing audio data via Bluetooth is provided in the present disclosure. The method may include: a digital signal processor receiving a basic packed data template from an application processor, wherein the basic packed data template is used for packing audio data packets in SBC format; a SBC module coding audio source data to obtain a first audio data packet in SBC format; the digital signal processor implementing a data packing process to the first audio data packet in SBC format based on the basic packed data template, to obtain a packed audio data packet; the digital signal processor implementing a dividing process and a packing process to the packed audio data packet to obtain a data packet to be sent, and requesting to send the data packet to be sent; and the digital signal processor sending the data packet requested to be sent to a Bluetooth controller via a PCM interface between the digital signal processor and the Bluetooth controller.

In some embodiments, the basic packed data template includes following parameters: a basic L2CAP heading, an information payload, a CSRC count, a payload type, a sequence number, a timestamp domain and a synchronous source identifier list; wherein the basic L2CAP heading includes a data length and a channel identifier of a target L2CAP; and wherein the CSRC count indicates a quantity of CSRCs.

In some embodiments, the coding implemented by the SBC module includes at least one parameter selected from a group consisting of: a sampling frequency, a channel mode, a block length, sub-bands, an allocation mode and a Bitpool.

In some embodiments, the data packing process includes: once the first audio data packet in SBC format is sent, increasing a sequence number by 1 and filling a timestamp domain, wherein the timestamp domain counts in measurement of audio digital sample signal.

In some embodiments, the digital signal processor implementing the dividing process and the packing process includes: the digital signal processor dividing the packed audio data packet according to a length of a controller buffer; and the digital signal processor implementing a HCI layer packing, according to a HCI format, to the packed audio data packet.

In some embodiments, the digital signal processor sending the data packet requested to be sent to the Bluetooth controller via the PCM interface between the digital signal processor and the Bluetooth controller includes: the digital signal processor sending the data packet according to an occupancy state of a controller buffer, wherein the occupancy state of the controller buffer is indicated by HCI number of packet complete event from the Bluetooth controller.

In some embodiments, the audio source data are contained in a music file in MP3 format.

According to one embodiment of the present disclosure, a digital signal processor is provided. The digital signal processor may include: a HCI transport layer, a HCI and a data packing module; wherein the data packing module is configured to: implement a data packing to a first audio data packet in SBC format based on a basic packed data template to obtain a packed audio data packet, where the basic packed data template is received from an application processor and is used for packing audio data packets in SBC format, where the first audio data packet in SBC format is obtained by a SBC module coding audio source data; wherein the HCI is configured to: implement a dividing process and a packing process to the packed audio data packet to obtain a data packet to be sent, and request for sending the data packet to be sent; and wherein the HCI transport layer is configured to: send the data packet requested to be sent to a Bluetooth controller via a PCM interface between the digital signal processor and the Bluetooth controller.

In some embodiments, the basic packed data template includes parameters of: a basic L2CAP heading, an information payload, a CSRC count, a payload type, a sequence number, a timestamp domain, and a synchronization source identifier list; and wherein the basic L2CAP heading includes a data length and a channel identifier of a target L2CAP; wherein the CSRC count indicates a quantity of CSRCs.

In some embodiments, the coding implemented by the SBC module includes at least one parameter selected from a group consisting of: a sampling frequency, a channel mode, a block length, sub-bands, an allocation mode and a Bitpool.

In some embodiments, the data packing implemented to the first audio data packet in SBC format includes: a sequence number increasing one when one packet is sent;

and filling a timestamp domain, wherein the timestamp domain counts in measurement of audio digital sample signal.

In some embodiments, the dividing process and packing process implemented by the HCI to the packed audio data packet includes: the HCI dividing the packed audio data packet according to a length of a controller buffer; and the HCI implementing a HCI layer packing, according to a HCI format, to the packed audio data packet.

In some embodiments, the HCI transport layer sends the data packet requested to be sent to the Bluetooth controller via the PCM interface between the digital signal processor and the Bluetooth controller by: the HCI sending the data packet according to an occupancy state of a controller buffer, wherein the an occupancy state of the controller buffer is indicated by HCI number of packet complete event from the Bluetooth controller.

In some embodiments, the audio source data are contained in a music file in MP3 format.

According to one embodiment of the present disclosure, a user terminal is provided. The user terminal may include: an application processor, a digital signal processor, a Bluetooth controller, a SBC module, a UART interface adapted for data transmission configured between the application processor and the Bluetooth controller, a PCM interface adapted for data transmission between the digital signal processor and the Bluetooth controller; wherein the digital signal processor includes a HCI transport layer, a HCI and a data packing module; wherein the data packing module is configured to: receive a basic packed data template from an application processor; and implement a data packing to an audio data packet in SBC format based on the basic packed data template, to obtain a packed audio data packet, where the audio data packet in SBC format is obtained by a SBC module coding audio source data; wherein the HCI is configured to: implement a dividing process and a packing process to the packed audio data packet, to obtain a data packet to be sent; and request for sending the data packet to be sent; and wherein the HCI transport layer is configured to: send the data packet requested to be sent to the Bluetooth controller via the PCM interface between the digital signal processor and the Bluetooth controller.

In some embodiments, the user terminal is a smart phone or a tablet computer.

In comparison with prior art, embodiments of the present disclosure possess following advantages.

Accordingly, when a user terminal implements a process for playing audio contents via Bluetooth transmission, the digital signal processor thereof, instead of the application processor which is conventionally used in the art, is employed to implement various processing, required for Bluetooth transmission, to one or more audio data packets in SBC format based on the basic packed data template. And it is the digital signal processor to send the processed data to the BT controller by multiplexing of the PCM interface between the digital signal processor and the BT controller. In such a way, the processing implemented to the audio data packet for BT transmission will no longer influence the application processor for entering in a sleep mode, such that power consumption can be reduced.

Further, in some embodiments, additional functions added into the digital signal processor are simple. During a process of playing audio data via Bluetooth, the digital signal processor serves as a transmitter, thus the HCI transport layer and the HCI in the digital signal processor are not necessarily required to be configured with functions for serving as a receiver of corresponding modules in the existing application processor. Furthermore, the digital signal processor is employed to process the audio data packet. It is not necessary for the digital signal processor to process the play control signal. As such, the digital signal processor is not required to realize functions of distinguishing between command and data, and labeling command/data identifier, which are necessarily to be performed by a HCI transport layer in the existing application processor.

Moreover, in some embodiments, the digital signal processor receives the basic packed template from the AVDTP and the L2CAP of the application processor, thus packet template can be quickly and conveniently imported by using the existing templates in the application processor.

DETAILED DESCRIPTION

According to analyses in the background, in prior art, during a process of playing audio data via BT, audio data packets are required to be processed by each layer (i.e. a HCI transport layer, a HCI, a L2CAP, an AVDTP, and an A2DP) in the application processor. Thereafter, the processed audio date packets are sent, by a BT Controller through wireless communication, to a playback device (e.g. a BT earphone) on opposite side.

During the process of playing audio data via BT, audio data packets are constantly generated, which are required to be processed by each layer in the application processor (AP). Accordingly, during the entire process, the AP is unable to enter into a sleep mode.

In practice, when listening to an audio file, a user may not implement other operations at the same time. For example, when listening to music in MP3 format, the user may have a rest at the same time. In this case, the terminal does not required to implement other operations when playing the audio file via BT. Therefore, it is a good time for the AP in the terminal entering into a sleep mode.

During the process of playing audio data via BT, information required to be sent to the playback device on the opposite side mainly include: a play control signal and an audio data packet. The play control signal may be a control signal of opening, configuring, initiating, pausing, and etc.

The play control signal is generally trigged for responding to a user operation such as pausing, switching, etc. However, in practice, when listening to an audio file, the user may not pause or switch the audio file frequently. Therefore, the play control signal is seldom trigged for responding to the user operation.

However, the audio data packets are required to be transmitted, conventionally by the AP, during the entire playing process. In the technique solution provided by the present disclosure, when transmitting the audio data packets by Bluetooth transmission, the AP is no long necessary. Therefore, during the audio data playing process, the AP may enter into the sleep mode, thus reducing power consumption.

Usually, a BT Controller in an intelligent terminal not only includes a UART interface connected with the AP, but also includes a PCM interface connected with a digital signal processor. In the present disclosure, the PCM interface between the BT controller and the digital signal processor is employed for audio data transmission. Specifically, during a process of playing audio data via Bluetooth, the digital signal controller instead of the AP is used for processing the audio data packets, thus realizing BT transmission of audio data. Accordingly, in the present disclosure, through multiplexing of the PCM interface, more opportunity is created for the AP entering into the sleep mode. It can be understood that, power consumption of the digital signal processor is far less than that of the AP. Therefore, through the technique solution provided by the present disclosure, power consumption can be reduced.

In order to clarify the objects, characteristics and advantages of the present disclosure, embodiments of the present disclosure will be described in detail in conjunction with the accompanying drawings. The disclosure will be described with reference to certain embodiments. Accordingly, the present disclosure is not limited to the embodiments disclosed. It will be understood by those skilled in the art that various changes may be made without departing from the spirit or scope of the disclosure.

Figure 6:
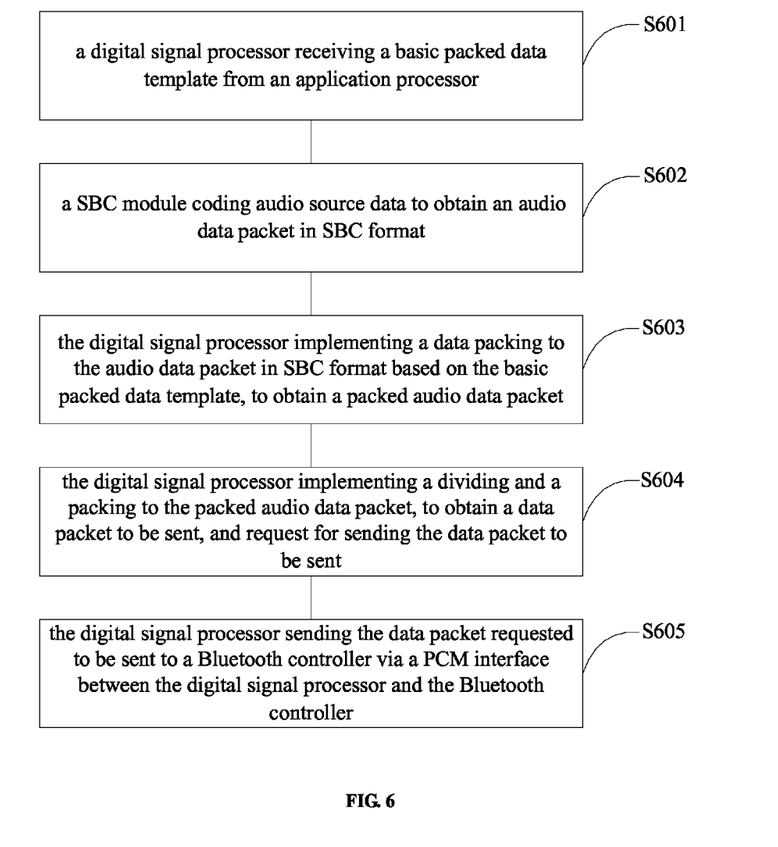
FIG. 6 schematically illustrates a flow chart of a method for playing audio data via Bluetooth according to one embodiment of the present disclosure.

Referring to FIG. 6, a flow chart of a method for playing audio data via Bluetooth according to one embodiment of the present disclosure is illustrated, which includes five steps from step S601 to step S605.

In step S601, a digital signal processor receiving a basic packed data template from an application processor.

Before playing audio data, the digital signal processor receives a basic packed data template from the AP. Thus, a basic packed data template is defined, wherein the basic packed data template is used for packing audio data packets in SBC format.

In prior art, the audio data packets in SBC format is packed by the AVDTP and the L2CAP in the AP. Data packets (i.e. basic packed data templates) of AVDTP and L2CAP are respectively as shown in FIG. 2 and FIG. 3.

In some embodiments of the present disclosure, the basic packed data template may include following parameters: a basic L2CAP heading, an information payload, a CSRC count, a payload type, a sequence number, a timestamp domain and a synchronization source identifier list. The basic L2CAP heading includes a data length and a channel identifier of target L2CAP. The CSRC count indicates a quantity of CSRCs included. Once a packet is sent, increasing the sequence number by 1. The timestamp domain counts in measurement of audio digital sample signal.

In some embodiments of the present disclosure, the digital signal processor may receive the basic packed template from the AVDTP and the L2CAP of the AP. It should be noted that, in some embodiments of the present disclosure, the basic packed template may be directly imported to the digital signal processor externally. The AP may be an ARM (Advanced RISC Machine) processor.

It can be seen from the illustration as recited above, in the present disclosure, the digital signal processor receives the basic packed template which is already exited in the AVDTP and the L2CAP of the AP. As a result, the basic packed template can be quickly and conveniently imported from the AP.

Accordingly, before implementing a process of playing audio data via BT, the basic packed data template is determined by the digital signal processor in advance. Thus, during the process of playing audio data via BT, a data packing process can be implemented to an audio data packet in SBC format according to the basic packed data template. And the processed audio data packet can be sent to a playback device on an opposite side by Bluetooth transmission.

The process of playing audio data via BT further includes following steps from step S602 to step S605.

In step S602, a SBC module coding audio source data to obtain a first audio data packet in SBC format.

Regarding the SBC coding, it is a format of the A2DP transmitting audio data. In some embodiment of the present disclosure, other coding module may be employed.

The SBC module is configured to code the audio source data into audio data packet in SBC format. The coding implemented by the SBC module includes at least one parameter selected from a group consisting of: a sampling frequency, a channel mode, a block length, sub-bands, an allocation mode and a Bitpool.

Referring to FIG. 4, typical code stream output rates of a SBC module is illustrated.

After the audio source data are coded by the SBC module, an audio data packet in SBC format is obtained. Thereafter, the audio data packet in SBC format is sent to the digital signal processor for being further processed.

In some embodiments of the present disclosure, the audio source data may be contained in a music file in MP3 format. In some embodiments of the present disclosure, the audio source data may be in other formats.

In step S603, the digital signal processor implementing a data packing to the first audio data packet in SBC format according to the basic packed data template, to obtain a packed audio data packet.

In prior art, the data packing is generally implemented by the AVDTP and the L2CAP in the AP. In the present disclosure, the data packing is implemented by the digital signal processor instead of the AP.

The data packing may include: link layer (i.e. L2CAP) connection establishing, link layer connection closing, link layer state managing, link layer multiplexing, link layer data packet dividing and/or link layer data packet assembling. The data packing may further include: transport layer (i.e. AVDTP) connection opening, transport layer connection closing, transport layer state managing, transport layer signal processing, transport layer multiplexing, transport layer data packet dividing, transport layer data packet assembling, transport layer user data configuring and/or transport layer user data transmitting. The user data includes A2DP SBC audio data.

Existing digital signal processors are unable to implement data packing. Thus, in the present disclosure, the digital signal processor is modified and adapted for realizing data packing to the data packet.

The data packing process implemented by the digital signal processor is similar to that implemented by the AVDTP and the L2CAP in the AP. Accordingly, the exiting digital signal processor is modified by configuring with two additional layers which are respectively similar to the AVDTP layer and the L2CAP layer in existing AP. Specifically, the two additional layers configured in the digital signal processor respectively possess partial functions of the AVDTP layer and the L2CAP layer.

In some embodiments, additional functions configured in the digital signal processor are simple. For example, only a sequence number and a timestamp domain are configured in the digital signal processor, wherein the sequence number increases by 1 once a packet is sent, and the timestamp domain counts in measurement of audio digital sample signal.

The first audio data packet in SBC format is packed to obtain the packed audio data packet, then being further processed.

In step S604, the digital signal processor dividing and packing the packed audio data packet to obtain a data packet to be sent, and sending a request for sending the data packet to be sent.

The digital signal processor dividing and packing the packed audio data packet may include: the digital signal processor dividing the packed audio data packet according to a length of the control buffer; and the digital signal processor implementing a HCI layer packing, according to a HCI format, to the packed audio data packet.

In prior art, the dividing process and the packing process are implemented by the HCI in the AP. However, in the present disclosure, the digital signal processor instead of the AP is used for implementing the dividing process and the packing process.

In some embodiments of the present disclosure, the method for playing audio data via BT may further include: after the data packet to be sent is obtained and the request for sending the obtained data packet is sent, marking the data packet requested to be sent with a length identifier.

In step S605, the digital signal processor sending the data packet requested to be sent to the BT controller through a PCM interface between the digital signal processor and the BT Controller.

Sending the data packet requested to be sent to the BT Controller through a PCM interface between the digital signal processor and the BT Controller may include: the digital signal processor sending the data packet according to an occupancy state of a controller buffer, wherein the occupancy state is indicated by HCI number of packet complete event from the BT Controller.

In prior art, the process of sending the data packet to the BT Controller is generally implemented by the HCI transport layer in the AP. However, in the present disclosure, this process is implemented by the digital signal processor instead of the application processor.

The existing digital signal processor does not possess functions of the HCI transport layer and functions of the HCI in the AP. Thus, modifications are required to be made to existing digital signal processors for realizing functions of the HCI transport layer and functions of the HCI in the AP.

Functions of the HCI transport layer when serving as a receiver and serving as a transmitter are different. Similarly, functions of the HCI when serving as a receiver and serving as a transmitter are different as well. It can be understood that, as an object of the present disclosure is realizing audio data playing via BT, the digital signal processor only serves as a transmitter but not a receiver. Therefore, the digital signal processor is not required to possess functions of the HCI transport layer and the HCI when they serving as receivers.

Moreover, in prior art, when serving as the transmitter, the HCI transport layer in the AP is configured to: distinguish information sent from the upper HCI layer into commands and data, and respectively mark the commands and the data with command/data labels and length indicators.

However, in the present disclosure, the digital signal processor is only employed to process the audio data packet but not to process a play control signal (the play control signal is still processed by the AP). Therefore, the digital signal processor is not required to be configured with functions aforementioned (i.e. distinguishing information sent from the upper HCI layer into commands and data, and respectively marking the commands and the data with command/data labels and length indicators).

In the present disclosure, in order to send the packed audio data packet to the BT Controller through the PCM interface, the digital signal processor is configured to: send HCI ACL data packet; process HCI number of packet complete event.

It can be seen from illustrations relating to step S603 and step S605 that, in some embodiments of the present disclosure, functions of the HCI transport layer and the HCI possessed by the digital signal processor can be simplified including: sending HCI ACL data packet, receiving and processing HCI number of packet complete event. The data packing module is simplified only adapted to process changed items during the audio data packing and transmitting processes. In other words, the data packing module is configured to realize sequence number increasing and timestamp domain filling.

From the illustration of the present disclosure as recited above, it can be seen that: in the present disclosure, additional functions configured into the digital signal processor are simple. During a process of playing audio data via BT, the digital signal processor serves as a transmitter, thus the HCI transport layer and the HCI in the digital signal processor are not necessarily required to be configured with functions for serving as a receiver of corresponding modules in the existing AP. Furthermore, the digital signal processor is employed to process the audio data packet. It is not necessary for the digital signal processor to process the play control signal. As such, the digital signal processor is not required to realize functions of distinguishing between command and data, and labeling command/data identifier, which are necessarily to be performed by a HCI transport layer in the existing AP.

In the present disclosure, the audio data packet is processed by the digital signal processor, but the play control signal is processed by the application processor. Accordingly, the buffer controller is configured to divide the buffer into two parts, one part is provided to the digital signal processor for transmitting the audio data packets, and the other part is provided to the AP for transmitting the play control signal.

As recited above, the play control signal is generally trigged for responding to user operations. In practice, when listening to an audio file, the user may not frequently implement an operation such as pausing, switching, etc. In other words, the AP is not required to process the play control signal frequently. Accordingly, processing the play control signal has little influence to the sleep of the application processor.

Figure 7:
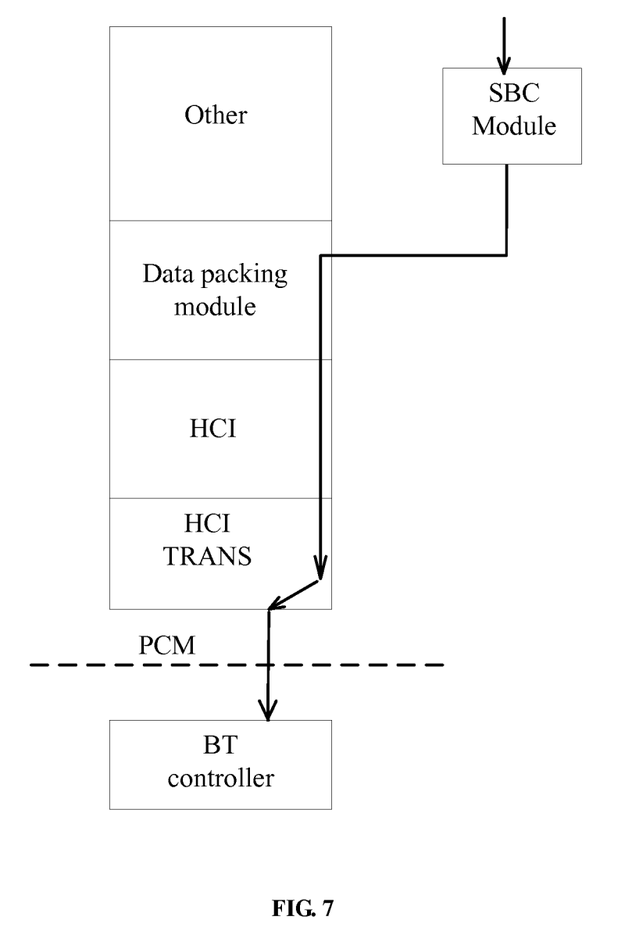
FIG. 7 schematically illustrates a process of playing audio data via Bluetooth according to one embodiment of the present disclosure.

Referring to FIG. 7, a process of playing audio data via BT according to one embodiment of the present disclosure is illustrated. In FIG. 7, arrows are used to indicate the direction of a data flow.

In the present disclosure, when a user terminal implements a process for playing audio contents via BT transmission, the digital signal processor thereof, instead of the AP which is conventionally used in the art, is employed to implement various processing, required for Bluetooth transmission, to one or more audio data packets in SBC format based on the basic packed data template. And it is the digital signal processor to send the processed data to the BT Controller by multiplexing of the PCM interface between the digital signal processor and the BT Controller. In such a way, the processing implemented to the audio data packet for BT transmission will no longer influence the AP for entering in a sleep mode, such that power consumption can be reduced.

Figure 8:
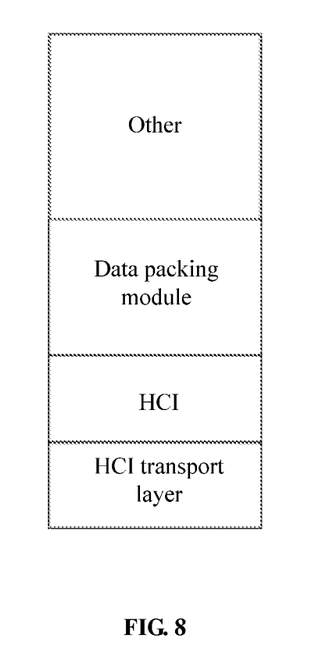
FIG. 8 schematically illustrates a structure of a digital signal processor according to one embodiment of the present disclosure.

Referring to FIG. 8, a structure of a digital signal processor according to one embodiment of the present disclosure is illustrated.

Between the digital signal processor and a BT Controller, a PCM interface is configured for transmitting data. The digital signal processor includes: a HCI transport layer, a HCI, and a data packing module.

The data packing module is configured to: pack an audio data packet in SBC format based on a basic packed data template, to obtain a packed audio data packet.

In some embodiments of the present disclosure, the data packing module receives a basic packed data template from the application processor in advance, thus defining the basic packed data template. The basic packed data template is used for packing audio data packets in SBC format.

The audio data packet in SBC format is obtained through a SBC module coding audio source data.

The HCI is configured to: divide and pack a packed audio data packet to obtain a data packet to be sent, and sent a request for sending, by the HCI layer, the obtained data packet.

The HCI transport layer is configured to: send the data packet requested to be sent, to the BT Controller via the PCM interface between the digital signal processor and the BT Controller.

It can be understood that, the digital signal processor may include other modules which will not be described herein, and only modules relating to the process of playing audio data via BT are illustrated.

Accordingly, in the present disclosure, when a user terminal implements a process for playing audio contents via BT transmission, the digital signal processor thereof, instead of the application processor which is conventionally used in the art, is employed to implement various processing, required for Bluetooth transmission, to one or more audio data packets in SBC format based on the basic packed data template. And it is the digital signal processor to send the processed data to the BT controller by multiplexing of the PCM interface between the digital signal processor and the BT controller. In such a way, the processing implemented to the audio data packet for BT transmission will no longer influence the application processor for entering in a sleep mode, such that power consumption can be reduced.

In some embodiments of the present disclosure, the audio source data may be contained in a music file in MP3 format.

In some embodiments of the present disclosure, the basic packed data template may include following parameters: a basic L2CAP heading, an information payload, a CSRC count, a payload type, a sequence number, a timestamp domain and a synchronization source identifier list. The basic L2CAP heading includes a data length and a channel identifier of target L2CAP. The CSRC count indicates a number of CSRCs included.

In some embodiments of the present disclosure, the sequence number increases by 1 once a packet is sent. The timestamp domain counts in measurement of audio digital sample signal.

In some embodiments of the present disclosure, the digital signal processor may receive the basic packed template from the AVDTP and the L2CAP of the application processor. Thus, existing template in the AP can be used for importing the template into the digital signal processor quickly and conveniently.

In some embodiments of the present disclosure, the parameter of SBC may include at least one selected from a group consisting of: a sampling frequency, a channel mode, a block length, sub-bands, an allocation mode and a Bitpool.

In some embodiments of the present disclosure, the data packing includes: once the first audio data packet in SBC format is sent, increasing the sequence number by 1 and filling the timestamp domain, wherein the timestamp domain counts in measurement of audio digital sample signal.

In some embodiments of the present disclosure, the dividing and packing processes implemented by the HCI to the packed audio data packet include: dividing the packed audio data packet according to a length of the control buffer; and implementing a HCI layer packing, according to a HCI format, to the packed audio data packet.

In some embodiments of the present disclosure, sending the data packet requested to be sent to the BT Controller through the PCM interface between the digital signal processor and the BT Controller may include: the HCI transport layer sending the data packet according to an occupancy state of the controller buffer, wherein the occupancy state is indicated by HCI number of packet complete event from the BT Controller.

In the present disclosure, the HCI transport layer and the HCI can be simplified only adapted to: send HCI ACL data packet, receive and process HCI number of packet complete event. The data packing module is simplified only adapted to process changed items during the audio data packing and transmitting processes. In other words, the data packing module is configured to realize sequence number increasing and timestamp domain filling.

From the illustration of the present disclosure as recited above, it can be seen that: in the present disclosure, additional functions configured into the digital signal processor are simple. During a process of playing audio data via Bluetooth, the digital signal processor serves as a transmitter, thus the HCI transport layer and the HCI in the digital signal processor are not necessarily required to be configured with functions for serving as a receiver of corresponding modules in the existing application processor. Furthermore, the digital signal processor is employed to process the audio data packet. It is not necessary for the digital signal processor to process the play control signal. As such, the digital signal processor is not required to realize functions of distinguishing between command and data, and labeling command/data identifier, which are necessarily to be performed by a HCI transport layer in the existing application processor.

According to one embodiment of the present disclosure, a user terminal is provided.

The user terminal includes an application processor, a digital signal processor, a BT Controller and a SBC module. Between the application processor and the BT Controller, a UART interface is configured for transmitting data. Between the digital signal processor, a PCM interface is configured for transmitting data.

Configuration of the digital signal processor can refer to FIG. 8 and corresponding illustrations as recited above. Accordingly, when a user terminal implements a process for playing audio contents via Bluetooth transmission, the digital signal processor thereof, instead of the application processor which is conventionally used in the art, is employed to implement various processing, required for Bluetooth transmission, to one or more audio data packets in SBC format based on the basic packed data template. And it is the digital signal processor to send the processed data to the BT controller by multiplexing of the PCM interface between the digital signal processor and the BT controller. In such a way, the processing implemented to the audio data packet for BT transmission will no longer influence the application processor for entering in a sleep mode, such that power consumption can be reduced.

Moreover, in the present disclosure, additional functions configured into the digital signal processor are simple. During a process of playing audio data via BT, the digital signal processor serves as a transmitter, thus the HCI transport layer and the HCI in the digital signal processor are not necessarily required to be configured with functions for serving as a receiver of corresponding modules in the existing application processor. Furthermore, the digital signal processor is employed to process the audio data packet. It is not necessary for the digital signal processor to process the play control signal. As such, the digital signal processor is not required to realize functions of distinguishing between command and data, and labeling command/data identifier, which are necessarily to be performed by a HCI transport layer in the existing application processor.

In some embodiments of the present disclosure, the user terminal may be a smart phone or a tablet computer.

It can be understood by person skilled in the art that, some or all the steps in the methods or processes recited above may be implemented by hardware under instructions of programs. The programs may be stored in a storage medium accessible for a computer. The storage medium may include: a ROM (Read Only Memory), a RAM (Random Access Memory), a disc, or a light disk.

Although the present disclosure has been disclosed above with reference to preferred embodiments thereof, it should be understood by those skilled in the art that various changes may be made without departing from the spirit or scope of the disclosure. Accordingly, the present disclosure is not limited to the embodiments disclosed.

What is claimed is:

1. A method for playing music data via Bluetooth, comprising:
   a digital signal processor receiving a basic packet data template from an application processor, wherein the basic packet data template is used for constructing music data packets;
   the digital signal processor implementing a data constructing process to the first music data packet based on the basic packet data template, to obtain a constructed music data packet,
   wherein the template is updated by the digital signal processor once the first music data packet is sent, by increasing a sequence number by 1 and filling a timestamp domain, wherein the timestamp domain counts in measurement of music digital sample signal;
   the digital signal processor implementing a dividing process and a Host Controller Interface (HCI) layer constructing process according to a HCI format to the constructed music data packet to obtain a data packet in the HCI format to be sent, and requesting to send the data packet in the HCI format to be sent; and
   the digital signal processor sending the data packet in the HCI format requested to be sent to a Bluetooth controller via a Pulse-code modulation (PCM) interface between the digital signal processor and the Bluetooth controller, thus during the music data playing process, the application processor is able to enter into a sleep mode.

2. The method for playing music data via Bluetooth according to claim 1, wherein the basic packet data template comprises parameters of: a basic Logical Link Control Adaptor Protocol (L2CAP) heading, an information payload, a Contributing Source (CSRC) count, a payload type, a sequence number, a timestamp domain and a synchronous source identifier list; wherein the basic L2CAP heading comprises a data length and a channel identifier of a target L2CAP; and wherein the CSRC count indicates a quantity of CSRCs.

3. The method for playing music data via Bluetooth according to claim 1, wherein the digital signal processor sending the data packet requested to be sent to the Bluetooth controller via the PCM interface between the digital signal processor and the Bluetooth controller comprises: the digital signal processor sending the data packet according to an occupancy state of a controller buffer, wherein the occupancy state of the controller buffer is indicated by HCI number of packet complete event from the Bluetooth controller.

4. A digital signal processor, comprising: a HCI transport layer, a Host Controller interface (HCI) and a data constructing module;
   wherein the data constructing module is configured to: implement a data constructing to a first music data packet based on a basic packet data template to obtain a constructed music data packet, where the basic packet data template is received from an application processor and is used for constructing music data packets, wherein the template is updated by the digital signal processor once the first music data packet is sent, by increasing a sequence number by 1 and filling a timestamp domain, wherein the timestamp domain counts in measurement of music digital sample signal;
   wherein the HCI is configured to: implement a dividing process and a Host Controller Interface (HCI) layer constructing process according to a HCI format to the constructed music data packet to obtain a data packet in the HCI format to be sent, and request for sending the data packet in the HCI format to be sent; and
   wherein the HCI transport layer is configured to: send the data packet in the HCI format requested to be sent to a Bluetooth controller via a Pulse-code modulation (PCM) interface between the digital signal processor and the Bluetooth controller, thus during the music data playing process, the application processor is able to enter into a sleep mode.

5. The digital signal processor according to claim 4, wherein the basic packet data template comprises parameters of: a basic Logical Link Control Adaptor Protocol (L2CAP) heading, an information payload, a Contributing Source (CSRC) count, a payload type, a sequence number, a timestamp domain and a synchronization source identifier list;
   wherein the basic L2CAP heading comprises a data length and a channel identifier of a target L2CAP; and
   wherein the CSRC count indicates a quantity of CSRCs.

6. The digital signal processor according to claim 4, wherein the HCI transport layer sends the data packet requested to be sent to the Bluetooth controller via the PCM interface between the digital signal processor and the Bluetooth controller by: the HCI sending the data packet according to an occupancy state of a controller buffer, wherein the occupancy state of the controller buffer is indicated by HCI number of packet complete event from the Bluetooth controller.

7. A user terminal, comprising: an application processor, a digital signal processor, a Bluetooth controller, a Universal Asynchronous Receiver/Transmitter (UART) interface adapted for data transmission configured between the application processor and the Bluetooth controller, a Pulse-code modulation (PCM) interface adapted for data transmission configured between the digital signal processor and the Bluetooth controller;

wherein the digital signal processor comprises a HCI transport layer, a Host Controller Interface (HCI) and a data constructing module;

wherein the data constructing module is configured to: receive a basic packet data template from an application processor, wherein the basic packet data template is used for constructing music data packets; and implement a data constructing to a first music data packet based on the basic packet data template, to obtain a constructed music data packet, wherein the template is updated by the digital signal processor once the first music data packet is sent, by increasing a sequence number by 1 and filling a timestamp domain, wherein the timestamp domain counts in measurement of music digital sample signal;

wherein the HCI is configured to: implement a dividing process and a Host Controller Interface (HCI) layer constructing process according to a HCI format to the constructed music data packet, to obtain a data packet in the HCI format to be sent, and request for sending the data packet in the HCI format to be sent; and     wherein the HCI transport layer is configured to: send the data packet in the HCI format requested to be sent to the Bluetooth controller via the PCM interface between the digital signal processor and the Bluetooth controller thus during the music data playing process, the application processor is able to enter into a sleep mode.

8. The user terminal according to claim 7, wherein the user terminal is a smart phone or a tablet computer.

\* \* \* \* \*